(12) United States Patent
Batterberry et al.

(10) Patent No.: US 7,054,774 B2
(45) Date of Patent: May 30, 2006

(54) MIDSTREAM DETERMINATION OF VARYING BANDWIDTH AVAILABILITY

(75) Inventors: Troy D. Batterberry, Kirkland, WA (US); Alexandre V. Grigorovitch, Redmond, WA (US); Anders E. Klemets, Redmond, WA (US); James C. Stewart, Woodinville, WA (US); Yejin Choi, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/609,329

(22) Filed: Jun. 27, 2003

(65) Prior Publication Data

US 2004/0267503 A1 Dec. 30, 2004

(51) Int. Cl.
*G06F 15/00* (2006.01)
(52) U.S. Cl. ........................................ 702/79
(58) Field of Classification Search ............... 702/79, 702/23, 89, 29; 705/7; 375/240, 239; 709/238, 709/233; 370/401, 468, 252, 402; 718/108; 725/95; 463/42
See application file for complete search history.

(56) References Cited

U.S. PATENT DOCUMENTS

| | | | |
|---|---|---|---|
| 4,963,995 A | 10/1990 | Lang | |
| 5,057,932 A | 10/1991 | Lang | |
| 5,132,964 A | 7/1992 | Esaki | |
| 5,164,839 A | 11/1992 | Lang | |
| 5,262,875 A | 11/1993 | Mincer et al. | |
| 5,440,334 A | 8/1995 | Walters et al. | |
| 5,568,181 A | 10/1996 | Greenwood et al. | |
| 5,710,970 A | 1/1998 | Walters et al. | |
| 5,787,472 A | 7/1998 | Dan et al. | |
| 5,835,495 A | 11/1998 | Ferriere | |
| 5,890,010 A | 3/1999 | Nishigami | |
| 5,931,961 A | 8/1999 | Ranganathan et al. | |
| 5,963,202 A | 10/1999 | Polish | |
| 5,978,567 A | 11/1999 | Rebane et al. | |
| 5,983,263 A | 11/1999 | Rothrock et al. | |
| 5,995,705 A | 11/1999 | Lang | |
| 5,996,015 A | 11/1999 | Day et al. | |
| 6,005,621 A | 12/1999 | Linzer et al. | |
| 6,014,706 A | 1/2000 | Cannon et al. | |
| 6,041,345 A | 3/2000 | Levi et al. | |
| 6,054,943 A | 4/2000 | Lawrence | |

(Continued)

OTHER PUBLICATIONS

Paknikar, Shantanu, et al. "A Caching and Streaming Framework for Multimedia," ACM Mutlitmedia 2000, Los Angeles, CA; pp. 13-20.

(Continued)

*Primary Examiner*—John Barlow
*Assistant Examiner*—Tung Lau
(74) *Attorney, Agent, or Firm*—Lee & Hayes, PLLC (57) ABSTRACT

Systems and methods for midstream determination of varying available bandwidth for streaming content between two network entities are described. During content streaming, a client requests a server to surge the content transmission rate. One or more bandwidth measurements are taken during the surge to determine if the increased transmission rate can be adequately managed. If the increased transmission rate can be adequately managed, the client may request the server to transmit remaining content at a transmission rate that is not greater than the increased, or surged, transmission rate. In a multi-bitrate file scenario, the surge rate may be higher than the rate of the fastest useable stream. In such a case, the fastest useable stream is selected. If the increased transmission rate is not suitable for future transmission, then the rate may remain at the original transmission rate.

33 Claims, 6 Drawing Sheets

U.S. PATENT DOCUMENTS

| | | | |
|---|---|---|---|
| 6,111,567 | A | 8/2000 | Savchenko et al. |
| 6,118,817 | A | 9/2000 | Wang |
| 6,120,149 | A | 9/2000 | Hosoi |
| 6,161,201 | A | 12/2000 | Payne et al. |
| 6,195,692 | B1 | 2/2001 | Hsu |
| 6,216,163 | B1 | 4/2001 | Bharali et al. |
| 6,272,148 | B1 | 8/2001 | Takagi et al. |
| 6,292,834 | B1 * | 9/2001 | Ravi et al. ............... 709/233 |
| 6,314,492 | B1 | 11/2001 | Allen et al. |
| 6,327,421 | B1 | 12/2001 | Tiwari et al. |
| 6,329,165 | B1 | 12/2001 | Chattoraj et al. |
| 6,343,298 | B1 | 1/2002 | Savchenko et al. |
| 6,385,647 | B1 | 5/2002 | Willis et al. |
| 6,405,256 | B1 | 6/2002 | Lin et al. |
| 6,449,269 | B1 | 9/2002 | Edholm |
| 6,502,135 | B1 | 12/2002 | Munger et al. |
| 6,611,868 | B1 | 8/2003 | Arutyunov |
| 6,614,763 | B1 | 9/2003 | Kikuchi et al. |
| 6,643,259 | B1 | 11/2003 | Borella et al. |
| 6,757,255 | B1 * | 6/2004 | Aoki et al. ............... 370/252 |
| 6,765,878 | B1 | 7/2004 | Carlson |
| 6,772,375 | B1 | 8/2004 | Banga |
| 6,785,288 | B1 * | 8/2004 | Enns et al. ............... 370/401 |
| 2002/0047899 | A1 | 4/2002 | Son et al. |
| 2002/0048448 | A1 | 4/2002 | Daniels |
| 2002/0049817 | A1 | 4/2002 | Drory et al. |
| 2002/0090027 | A1 | 7/2002 | Karczewicz et al. |
| 2003/0018799 | A1 | 1/2003 | Eyal |
| 2003/0236902 | A1 | 12/2003 | Weiss et al. |
| 2003/0236912 | A1 | 12/2003 | Klemets et al. |
| 2004/0003101 | A1 | 1/2004 | Roth et al. |

OTHER PUBLICATIONS

Guo, Katherine, et al. "RCache: Design and Analysis of Scalable, Fault Tolerant Multimedia Stream Caching Schemes," Scalability and Traffic Control in IP Networks, Proceedings of SPIE Vol. 4526, (2001); pp. 68-86.

Aboobaker, N., et al., "Streaming Media Congestion Control Using Bandwidth Estimation," Lecture Notes in Computer Science, 2002, vol. 2496, pp. 89-100.

Liefooghe, P., et al., "An Architecture for Seamless Access to Multicast Content," Proceedings of the 26th Annual IEEE Conference on Local Computer Networks, Nov. 8, 2000, pp. 488-494.

Braun, T., et al., "Multicast for Small Conferences," Proceedings of the Sixth IEEE Symposium on Computers and Communications, Jul. 3, 2001, pp. 145-150.

Fleischman, E., "WAVE and AVI Codec Registries," Network Working Group Request for Comments: 2361, The Internet Society, Jun. 1998, pp. 1-71.

Camarillo, G., et al., "Grouping of Media Lines in the Session Description Protocol (SDP)," Network Working Group Request for Comments: 3388, The Internet Society, Dec. 2002, pp. 1-21.

Handley, M., et al., "SDP: Session Description Protocol," Network Working Group Request for Comments: 2327, The Internet Society, Apr. 1998, pp. 1-42.

"Advanced Systems Format (ASF) Specification," Revision 01.20.01e, Microsoft Corp., Sep. 2003, pp. i-vi and 1-93.

Schulzrinne, H., et al., "RTP: A Transport Protocol for Real-Time Applications," Network Working Group Request for Comments: 3550, Jul. 2003, pp. 1-104.

Muuss, M., "The Story of the PING Program," Oct. 18, 1999, retrieved on Apr. 6, 2004 from the Internet Archive at <http://web.archive.org/web/19991018225218/ftp.arl.mit/~mike/ping.htm>, 3 pages.

Muuss, M., "The Research Interests of Mike Muuss," Oct. 8, 1999, retrieved on Apr. 6, 2004 from the Internet Archive at <http://web.archive.org/web/19991008020453/ftp.arl.mit/~mike/>, 2 pages.

Fielding R. et al, "Hypertext Transfer Protocol—HTTP/1.1," Network Working Group Request for Comments: 2616; The Internet Society (Jun. 1999); Category: Standards Track. pp. 1-176.

Schulzrinne, H., et al., "Real Time Streaming Protocol (RTSP)," Network Working Group Request for Comments: 2326; The Internet Society (Apr. 1998). pp. 1-92.

Jin, S., et al. "Accelerating Internet Streaming Media Delivery using Network-Aware Partial Caching," 2002 IEEE, pp. 153-160.

Lai, Baker, "Measuring Bandwidth", INFOCOM 99. Eighteenth Annual Joing Conference of the IEEE Computer and Communications Societies. IEEE New York, NY, Mar. 21-25, 1999, pager 235-245.

Minshall G et al. "Application performance pitfalls and TCP's Nagle algorithm", vol. 27, No. 4, pp. 36-44, XP002233094 Performance Evaluation Review, Mar. 2000, ACM.

Hayes D A et al; "Impact of FLow Control on Quality of service driven packet scheduling disciplines", Control Applications, 1999. Proceedings of the 1999 IEEE International Conference on Control Applications; Kohala Coast, HI Aug. 22, 1999; pp. 1454-1459.

"A Mathematical Theory of Communication", Shannon, C.E., The Bell System Technical Journal, vol. 27, pp. 379-423, 623-656, (pgs renumbered as 1-55), Jul., Oct., 1948.

"TAPI 3.0 Connection and Media Services", Microsoft Windows 2000 Server, Copyright 1999, pp. 1-23.

Microsoft Computer Dictionary 5th Edition, p. 428.

Kamiyama N et al. "Renegotiated CBR transmission In interactive video-on-demand system", Multimedia Computing and Systems '97 Proceedings, IEEE International Conference, Ottawa ONT, Canada Jun. 3-6, 1997. pp. 12-19.

Petit G H et al., "Bandwidth resource optimization in ivdeo-on-demand network architectures", Community Networkign Integrated Multimedia Services to the Home, 1994, Proceedings of the 1st International Workshop on San Francisco, CA Jul. 13-14, 1994, pp. 91-97.

Dutta A et al. "A Streaming architecture for next generation internet", ICC 2001, 2001 IEEE International Conference on Communications. Helsinky, Finland, Jun. 11-14, 2001, 1303-1309.

Lixin Gao et al. "Supplying instantaneous video-on-demand services using controlled multicast", Multimedia Computing and Systems, 1999, IEEE International Conference on Florence, Italy Jun. 7,11, 1999, pp. 117-121.

Nishida, Y. et al., "Congestion Control Mechanism for TCP with Packet Pair Scheme"; IEICE Transactions on Information and Systems, Institute of Electronics Information and Comm. Egn. Tokyo, JP, vol. E82-D, No. 4, Apr. 1999 pp. 854-862.

Khalil, et al., "Performance Considerations for TCP/IP in Wide Area Networks", IEEE, 1994, pp. 166-175.

Moldeklev, et al., "How a Large ATM MTU Causes Deadlocks in TCP Data Transfers", IEEE/ACM Transactions on Networking, vol. 3, No. 4, Aug. 1995, pp. 409,422.

* cited by examiner

Fig. 1 (background)

Fig. 2
(background)

Fig. 4

Fig. 3
(background)

MIDSTREAM DETERMINATION OF VARYING BANDWIDTH AVAILABILITY

TECHNICAL FIELD

The systems and methods described herein relate to measuring bandwidth availability. More particularly, the systems and methods described herein relate to midstream determination of bandwidth availability for a connection between to entities on a network, even in cases where available bandwidth varies.

BACKGROUND

As the Internet has matured, the format characteristics of the content available on the Internet have changed. Sound and video content is now mixed in with the traditional textual content. However, this new content on the Internet requires a greater connection speed (i.e., bandwidth) than was commonly available a few years ago.

Figure 1:
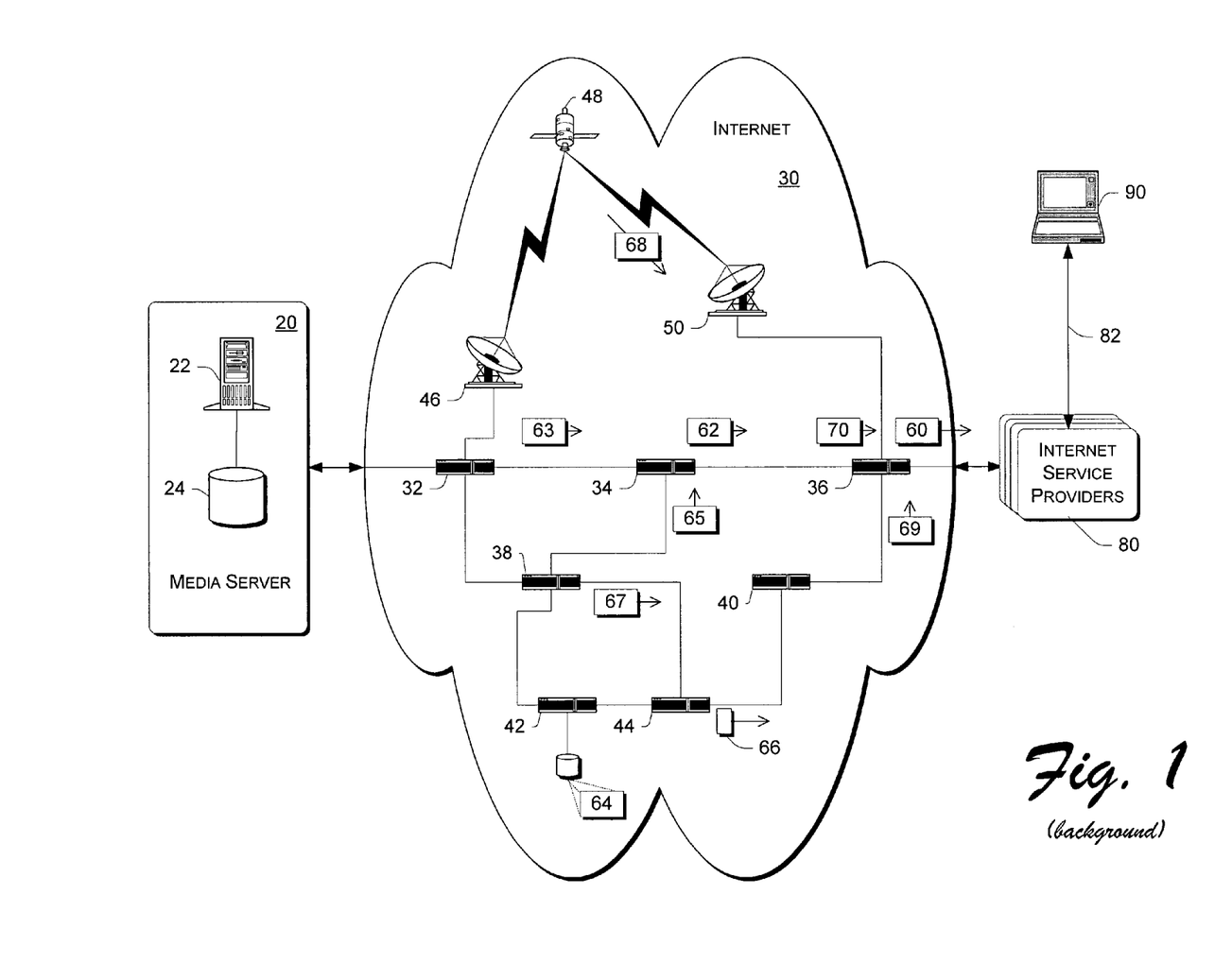
FIG. 1 illustrates a typical public networking environment (such as the Internet) and the routing of and delay of data packets sent from a server to a client.

FIG. 1 illustrates an example of a typical Internet configuration. It includes a server (such as media server 20), which is coupled to the Internet 30. The server typically includes one or more physical server computers 22 with one or more physical storage devices and/or databases 24. On the other side of an Internet transmission is a client 90, which is connected via one of many available Internet Service Providers (ISPs) 80. Herein, a server is a network entity that sends data and a client is a network entity that receives data.

Cloud 30 is labeled the Internet, but it is understood that this cloud represents that portion of the Internet that does not include the server, client's ISP, and the client. Inside such cloud are the routers, transmission lines, connections, and other devices that more-often-than-not successfully transmit data between clients and servers. Inside exemplary Internet cloud 30 are routers 32–44; two satellite dishes 46 and 50; and a satellite 48. These represent the possible paths that a data packet may take on its way between the server and the client.

Bandwidth

Bandwidth is the amount of data that can be transmitted in a fixed amount of time. For example, bandwidth between media server 20 in FIG. 1 to media client 90 is calculated by the amount of data (e.g., 1000 bits) that may be transmitted between them in a unit of time (e.g., one second).

As shown in FIG. 1, a transmission over the Internet travels across multiple links before it reaches its destination. Each link has its own bandwidth. Like a chain being only as strong as its weakest link, the maximum bandwidth between server 20 and client 90 is the link therebetween with the slowest bandwidth. Typically, that is the link (such as link 82 in FIG. 1) between the client 90 and its ISPs 80. That slowest bandwidth is the maximum de facto bandwidth.

Herein, unless otherwise apparent from the context, references to bandwidth between network entities (such as server 20 and client 90) is assumed to be the maximum de facto bandwidth therebetween.

Bandwidth may also be called "connection speed", "speed", or "rate". In references to bandwidth measured by bits per second, it may also be called "bit rate" or "bitrate."

Streaming Media

Streaming is a technique for transferring multimedia data such that it can be processed as a steady and continuous stream. Streaming technologies are becoming increasingly important with the growth of the Internet because most users do not have fast enough access to download large multimedia files quickly. With streaming, the client browser or plug-in can start displaying the data before the entire file has been transmitted.

For streaming to work, the client side receiving the data must be able to collect the data and send it as a steady stream to the application that is processing the data and converting it to sound or pictures. This means that if the streaming client receives the data more quickly than required, it needs to save the excess data in a buffer. If the data doesn't come quickly enough, however, the presentation of the data will not be smooth.

Within the context of an audio and/or visual presentation, "media" and "multimedia" are used interchangeably herein. Media refers to the presentation of text, graphics, video, animation, and/or sound in an integrated way.

"Streaming media" is an audio and/or visual presentation that is transmitted over a network (such as the Internet) to an end-user. Such transmission is performed so that the presentation is relatively smooth and not jerky. Long pauses while additional frames are being downloaded to the user are annoying to the user. These annoyances encourage a user to avoid viewing future streaming media.

Smoothly Transmitting Streaming Media

Since the bandwidth determines the rate at which the client will receive data, a streaming media presentation may only be presented at a rate no greater than what the bandwidth allows. For example, assume media server 20 needs to send data at 50 Kbps to the client 90 in order to smoothly "play" a streaming media presentation. However, the bandwidth between the client and server is only 30 Kbps. The result is a jerky and jumpy media presentation.

In an effort to alleviate this problem, streaming media presentations are often encoded into multiple formats with differing degrees of qualities. The formats with the lowest quality (e.g., small size, low resolution, small color palette) have the least amount of data to push to the client over a given time. Therefore, a client over a slow link can smoothly present the streaming media presentation, but the quality of the presentation suffers. The formats with the highest quality (e.g., full screen size, high resolution, large color palette) have the greatest amount of data to push to the client over a given time. Therefore, the client with a fast link can smoothly present the streaming media presentation and still provide a high quality presentation.

Select-a-Bandwidth Approach

When a server sends streaming media to a client, it needs to know what format to use. Thus, in order to select the proper format, the server must to know the bandwidth between the server and the client.

This easiest way to accomplish this is to ask the user of the client what their bandwidth is. Since a client's link to the Internet is typically the bandwidth bottleneck, knowing the bandwidth of this link typically indicates the actual bandwidth.

Figure 2:
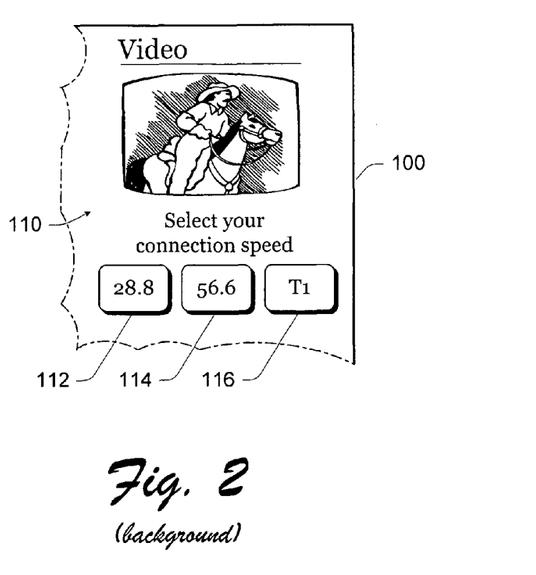
FIG. 2 is cut-away portion of a Web page. The cut-away shows a user interface providing a user a mechanism for selecting the bandwidth. This shows a conventional technique for determining bandwidth.

FIG. 2 shows a cut-away 100 of a Web page displayed on a client's computer. Inside the cut-away 100, is a typical user-interface 110 that may be used to ask a user what their connection speed is. The user clicks on one of the three buttons 112, 114, and 116 provided by the user-interface 110. If the user clicks on button 112, the server delivers data from a file containing streaming media in a format designed for transmission at 28.8 Kbps. Likewise, if the user clicks on button 114, data sends from a file containing streaming media in a format designed for transmission at 56.6 Kbps. If the user clicks on button 114, the server delivers data from a file containing streaming media in a format designed for transmission at a rate greater than 56.6 Kbps and up-to the typical speed of a T1 connection.

However, the primary problem with the "select-a-bandwidth" approach is that it requires a thoughtful selection by a user. This approach invites selection errors.

It requires that a user care, understand, and have knowledge of her connection speed. Often, a user does not pay particular attention to which button to press. The user may only know that a media presentation will appear if the user presses one of these buttons. Therefore, they press any one of them.

Often, a user does not understand the concept of bandwidth. A user may choose button 116 because she may want to see the presentation at its highest quality. This user does not realize that seeing the presentation at its highest quality may result in a non-smooth presentation because her Internet connection cannot handle the rate that the data is being sent through it.

If she does understand the concept of bandwidth, then the user may not know her bandwidth. A user may simply be ignorant of her bandwidth. In addition, varying degrees of noise may cause varying connection speeds each time a user connects to the Internet. Furthermore, some types of connections (such as a cable modem) can have wide degrees of connection speed depending upon numerous factors.

Moreover, the user needs to understand the implications of an incorrect choice. A user needs to be educated so that she understands that she needs to select an option that is equal to or less than her bandwidth to get a smooth presentation. But she should not choose one that is significantly less than her bandwidth. If she does, then she will be seeing a smooth presentation at a lower quality that she could otherwise see at a higher available bandwidth.

As can be seen by the above discussion, this manual approach is often confusing and intimidating to many user. Therefore, it often results in incorrect selections.

What's more, maintaining multiple files (one for each bandwidth) at the media server adds to the overhead of maintaining a Web site.

Automatic Bandwidth Detection

To overcome these problems, media servers use a single file containing subfiles for multiple bandwidths. Also, media servers automatically detect the bandwidth.

This single file is called a MBR (multiple bit rate) file. The MBR files typically include multiple differing "bands" or "streams." These bands may be called "subfiles." A user only clicks on one link. Automatically, behind the scenes, the server determines the proper stream to send to the client based on the speed selected by the client.

In an environment where end-to-end latency is very high, this automatic speed detection may take a long time. This means that an additional five to thirty seconds is added to the user's wait for the presentation to begin. One factor in this delay for existing automatic speed detection is because of long "handshaking" times while the speed determination is going on.

One existing automatic detection technique involves sending multiple data packets for measuring the speed between the server and client. This technique is described further below in the section titled, "Multiple Measurement Packets Technique."

Bandwidth Measurement Packets

Typically, automatic bandwidth detection techniques measure bandwidth between entities on a network by sending one or more packets of a known size.

Figure 3:
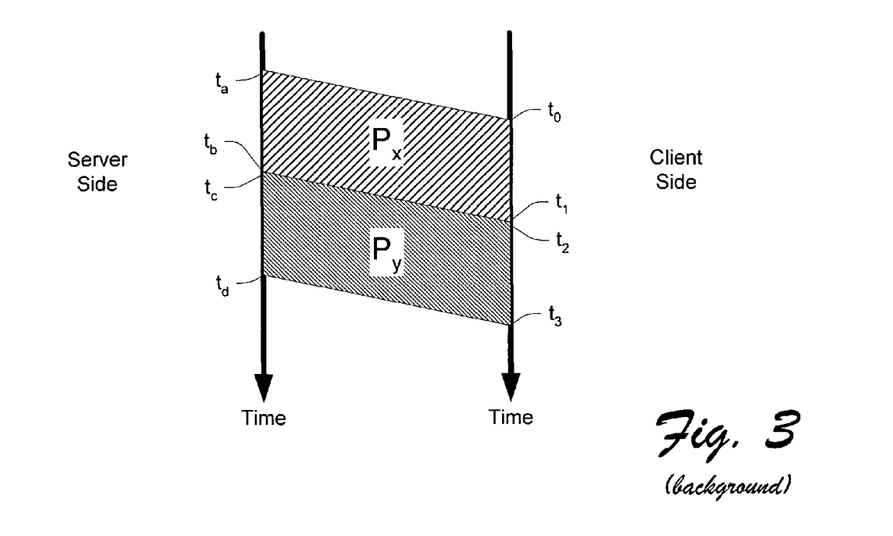
FIG. 3 shows a packet pair (being sent from a server to a client) graphed in the time domain. This shows a conventional implementation of packet-pair technique to measure bandwidth.

FIG. 3 shows a time graph tracking the transmission of two such packets ($P_x$ and $P_y$) between a sender (e.g., server) and a receiver (e.g., client). The server and client sides are labeled so. On the graph, time advanced downwardly.

Time $t_a$ indicates the time at the server the transmission of $P_x$ begins. Time $t_b$ indicates the time at the server the transmission of $P_x$ ends. Similarly, Time $t_0$ indicates the time at the client begins receiving $P_x$. Time $t_1$, indicates the time at the client completes reception of $P_x$. At $t_1$, the network hardware presumably passes the packet up the communication layers to the application layer.

Packet $P_y$ is similarly labeled on the time graph of FIG. 3. $t_c$ is the server time at the transmission of $P_y$ begins. $t_d$ is the server time that the transmission of $P_y$ ends. Similarly, $t_2$ the client time that it begins receiving $P_y$. $t_3$ is the client time that it completes reception of $P_y$. At $t_3$, the network hardware presumably passes the packet up the communication layers to the application layer.

Bandwidth Measurement Using a Single Packet.

In a controlled, laboratory-like environment, measuring bandwidth between two entities on a network is straightforward. To make such a calculation, send a packet of a known size from one entity to the other and measure the transmission latency, which is the amount of time it takes a packet to travel from source to destination. Given this scenario, one must know the time that the packet was sent and the time that the packet arrived.

This technique is nearly completely impractical outside of the laboratory setting. It cannot be used in an asynchronous network (like the Internet) because it requires synchronization between the client and server. Both must be using the same clock.

Alternatively, the client may track the time it begins receiving a packet (such as $t_0$ for $P_x$) and the time the packet is completely received (such as $t_1$ for $P_x$).

FIG. 3 shows packet $P_x$ being sent from a server to a client. $P_x$ has a known size in bits of PS. The formula for calculating bandwidth (bw) is $$bw(P_x) = \frac{PS}{t_1 - t_0} \quad \text{Formula 1 (Single Packet)}$$

This technique works in theory, but unfortunately does not work in practice. Only the hardware knows when a packet is initially received. Therefore, only the hardware knows when $t_0$ is.

The other communication layers (such as the transport layer and the application layer) can only discover the time when the packet is completely received by the hardware. That is when the hardware passes it up to them. This completion time for packet $P_x$ is $t_1$. It is not possible to calculate bandwidth only one knowing one point in time.

Packet-pair. A technique called packet-pair is used to overcome these problems in asynchronous networks. With packet-pair, the server sends a pair of packets, one immediately after the other. The bandwidth is determined by dividing the packet size by the time difference in reception of each packet.

Each packet has specific measurable characteristics. In particular, these characteristics include its packet size (PS) and the measured time such a packet arrives (e.g., $t_{0-3}$ in FIG. 3). Some characteristics (such as packet size) may be specified rather than measured, but they may be measured if so desired.

As shown in FIG. 3, the server sends packet, $P_x$. The client's hardware begins receiving the packet at $t_0$. When reception of the packet is complete at $t_1$, the hardware passes it up the communication layers. Ultimately, it is received by the destination layer (e.g., application layer) at presumably $t_1$.

After the server sends $P_x$ (which is completed at $t_b$), it immediately sends packet $P_y$ at $t_c$. It is important that there be either 1) absolutely no measurable delay between $t_b$ and $t_c$ or 2) a delay of a known length between $t_b$ and $t_c$. Herein, to simplify the description, it will be assumed that there is no measurable delay between $t_b$ and $t_c$.

The client's hardware begins receiving $P_y$ at $t_2$. When reception of the packet is complete at $t_3$, the hardware passes it up the communication layers. Ultimately, it is received by the destination layer (e.g., application layer) at presumably $t_3$.

FIG. 3 shows no delay between $t_1$ (the time of completion of reception of $P_x$) and $t_2$ (the time reception of $P_y$ begins). Theoretically, this will always be the case if $P_x$ and $P_y$ are transmitted under identical conditions. In practice, is the often the case because $P_y$ is sent immediately after $P_x$.

Using packet-pair, the formula for calculating bandwidth (bw) is $$bw(P_x P_y) = \frac{PS}{t_3 - t_1} \quad \text{Formula 2 (Packet-Pair)}$$

This technique works in theory and in practice. However, it only works well over a network that is relatively static.

For example, in FIG. 1, assume the network consists of only the server 20; routers 32, 34, and 36; a specific ISP of ISPs 80; and client 90. Further, assume that the links between each node on this static network is fixed and has a consistent bandwidth. In this situation, the packet-pair techniques provide an accurate and effective measurement of bandwidth.

Packet-pair does not work well over the Internet. However, the packet-pair technique does not work well over a dynamic network, like the Internet. A dynamic network is one where there is a possibility that a packet may be handled in a manner different from an earlier packet or different from a later packet.

FIG. 1 illustrates examples of those handling differences. Assume that all packets are traveling from the server to the client (from left to right in FIG. 1). Assume that packets 60–68 were sent back-to-back by the server 20 to the client 90. Assume that packet 70 was sent by another server (not shown) to the client 90 and it is unrelated to bandwidth measurement.

Notice, as illustrated in FIG. 1, that packets may take different routes. In addition, some routes may significantly delay the packet transmission. This is especially true if the packet is transmitted via an apparently unusual (but not necessarily uncommon) route, such as wireless transmission, oversees via an underwater cable, satellite transmission (as shown by dishes 46 and 50 and satellite 48), etc.

A router (such as router 42) may delay a packet (such as 64) more than another may by temporarily buffering it. Another packet (such as packet 70) from another source may slip in between two packets (such as packets 60 and 62). In addition, a modem (not shown) of the client may compress packets.

Communications equipment (such as a modem) may compress a packet (such as 66) to shrink the packet size and thus speed along transmission. Such packet compression can significantly affect the bandwidth measurement because not all of the subsequent data packets will be compressed or compressed at the same rate.

Multiple Measurement Packets Technique

To overcome these problems, conventional automatic bandwidth measurement techniques uses multiple packets. A server sends several (much more than two) packets and calculates the speed of each. Conventional wisdom on bandwidth measurement indicates that in order to get accurate measurements several pairs of packets must be sent repeatedly over several seconds to several minutes. Herein, this technique is called "multiple-packets" to distinguish it from the above-described "packet-pair" technique.

Typically, the ultimate bandwidth is determined by finding the average of the many bandwidth measurements. This averaging smoothes out variances in delays for each packet; however, it does not compensate for packet compression during transmission. One of two extremely incorrect measurements will skew the average.

Unfortunately, this technique takes a long time relative the existing wait for the user between click and media presentation. A long time may be five seconds to several minutes depending on the data and the situation. Such a delay adds to the annoyance factor for the user who wishes experience the media presentation. This is not an acceptable delay. Since there are no other options available using conventional techniques, the user is forced to endure these delays.

Moreover, these conventional approaches typically use TCP to transmit the packets. Using TCP introduces additional delays for handshaking. These conventional approaches typically modify the kernel of the operating system (usually the transport layer) to perform these measurements.

Varying Bandwidth

Another problem encountered with streaming multimedia content is that, after the initial bandwidth measurement is taken and a streaming rate is determined, factors that influenced the selection of the streaming rate may change. As a result, the bandwidth that is available for streaming media changes as well. For example, if network congestion was a problem at the time the measurement was taken, then the selected streaming rate may be lower than it could be when the network congestion clears. Conversely, if network congestion occurs after the streaming rate has been selected, then the quality of the multimedia presentation may suffer as a result of streaming at a faster rate than the network can accommodate.

Sole reliance on initial bandwidth measurements, therefore, may provide a less than optimum streaming experience.

SUMMARY

Various systems and methods described herein provide for midstream determination of varying available bandwidth for streaming content between two network entities.

In at least some implementations, during content streaming, a client may request a server to send data at an increased transmission rate for a limited period of time, i.e. to "surge" the content transmission. One or more bandwidth measurements are taken during the surge to determine if the increased transmission rate is more optimally suited for the content stream.

If the transmission surge is determined to be viable for transmission of the content stream, the client may request the server to continue to transmit remaining content at the higher transmission rate. If the higher transmission rate is not suitable for future transmission, then the rate may remain at the original transmission rate.

BRIEF DESCRIPTION OF THE DRAWINGS

The same numbers are used throughout the drawings to reference like features and components.

DETAILED DESCRIPTION

Systems and methods for midstream determination of varying network bandwidth for streaming content are described herein. One or more exemplary implementations of systems and methods for determining bandwidth availability during content streaming are shown. The described systems and methods are exemplary only and are not meant to limit the scope of the appended claims. Other embodiments not described herein may be implemented without departing from the scope of the appended claims.

Utilizing Content Packets for Packet Pair Measurements

Using back to back data packets to measure throughput and bandwidth availability is described in U.S. patent application Ser. No. 09/636,456, filed Aug. 9, 2000, entitled "Fast Dynamic Measurement of Connection Bandwidth" and assigned to MICROSOFT CORP®, the assignee of the present application. Said patent application is hereby incorporated by reference. Similar logic is extended n the presently described systems and methods to include sending back to back content packets (where "back to back" means without any significant intervening time gap) while actually streaming to determine instantaneous bandwidth and therefore allow the client to more quickly act upon link congestion.

The described systems and methods also use this technique to determine availability of additional bandwidth. In addition to using occasional single packet pairs during the streaming process, multiple packet pairs can be sent back to back to develop both individual packet pair measurements as well as an aggregate measurement of the total data received over the span of the packets.

For example, consider a case in which four 1500 byte packets are sent immediately subsequent to each other. In addition to yielding three individual packet pair measurements, the time required to receive all three packets can also be combined to allow a more precise measurement of bandwidth over a larger timeframe.

Since all of these measurements take place using content that is in the process of being streamed anyway, no additional bandwidth needs to be consumed and no additional latency is incurred. Since most encoded content is already highly entropic, compression algorithms used in the streaming process will not skew the measurement results. Only the server needs to flag the packets as being back to back so that the client recognizes that it can use them for dynamic (midstream) bandwidth measurements.

History Lists

Figure 4:
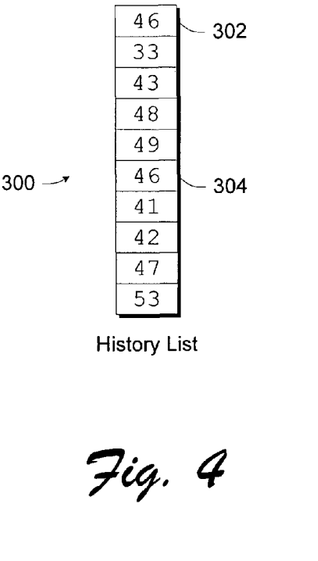
FIG. 4 is a visual representation of a history list of the last ten measured bandwidths.

FIG. 4 is a visual representation of a history list 300 of recorded bandwidth measurements. A client keeps this history of calculated bandwidths to ameliorate the effect of an inaccurate bandwidth measurement. Upon re-connection with a server to which the client has previously been connected, a client will access the history list 300 and initially connect at a rate equal to the median rate included in the history list 300. It is noted that the client could determine a connection rate from the history list 300 in another manner, such as by taking a mean of the rates included in the history list 300. However, utilizing a median rate from the history list 300 is less likely to be skewed by an extremely aberrant entry.

In at least one other implementation, the history list 300 may be accessed upon connection with any server, not just a server to which the client has previously been connected.

Items are added and removed from the list in a FIFO (first in, first out) method. Utilizing the FIFO technique, the latest ten measurements are always included in the list (although the history list 300 may contain a greater or fewer number of rates than ten).

In the systems and methods described herein, bandwidth measurements taken mid-stream are stored in a history list. Techniques that take bandwidth measurements at an initial connection between client and server may not be entirely accurate.

For example, consider a user of a proxy device that marshals all TCP traffic through a latent architecture prior to forwarding on to the client. While the firewall may be capable of processing relatively high bitrate streams, it may inadvertently add time between the forwarding of a specific packet and therefore cause the client to believe it has an artificially low (or high) bandwidth connection. If the history lists only contain the initial measurement and if the behavior is consistent between attempts (as is the case with many proxies/firewalls), the client will always believe it has an artificially low (or high) bandwidth connection.

By taking midstream measurements of available bandwidth, the client can correct the values stored in the history lists. By using a history list, a good estimation of the link bandwidth may be determined very quickly, thus providing a high-quality experience for a user. Further functionality of the history list 300 will be described in greater detail, below.

Exemplary Environment

Figure 5:
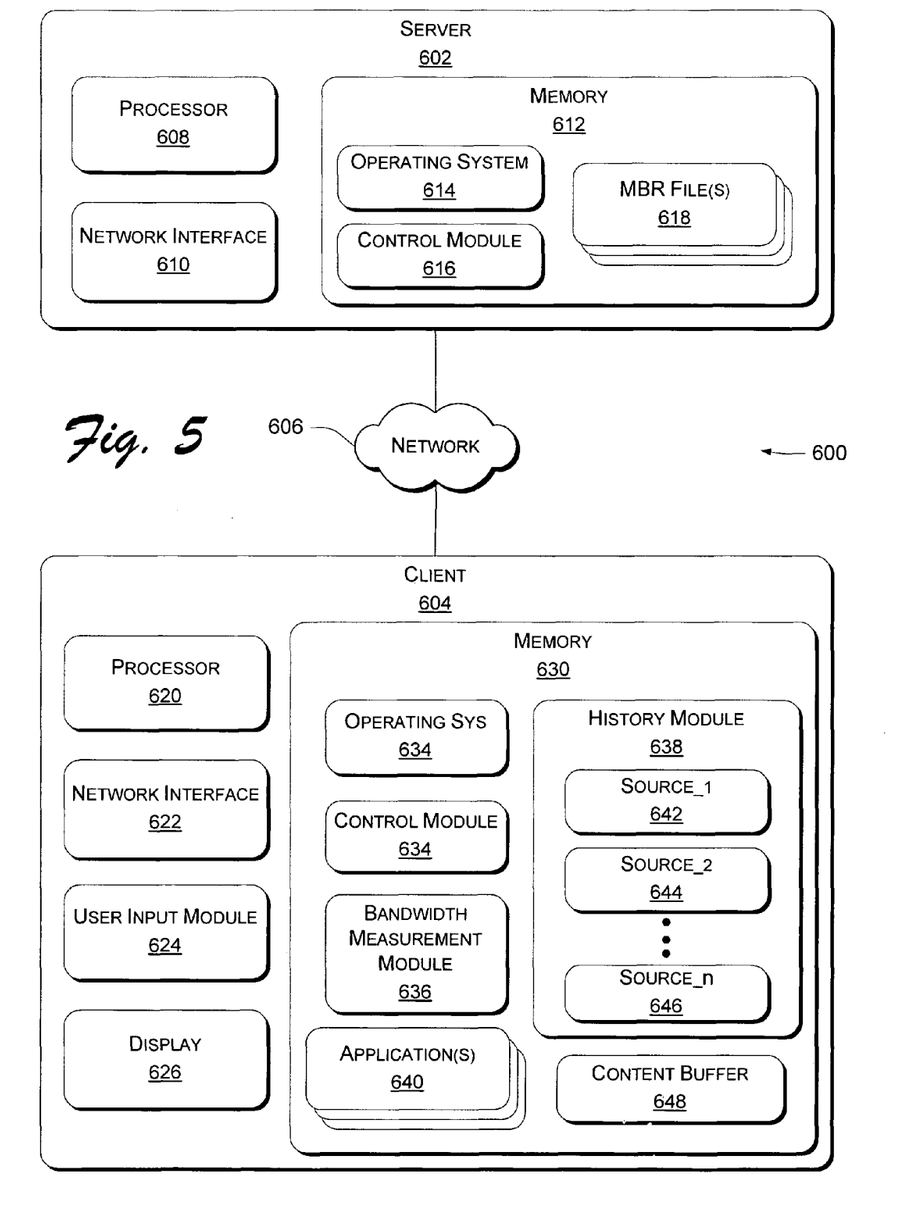
FIG. 5 is a block diagram of an exemplary server-client environment for midstream determination of available streaming bandwidth.

FIG. 5 is a block diagram of an exemplary server-client environment 600 for midstream determination of available streaming bandwidth. The environment 600 includes a server 602 and a client 604 that communicate with each other through a network 606. The network 606 may be the Internet, a local area network, a wide access network, or the like.

The server 600 includes a processor 608, a network interface 610 for communicating with the network 606, and memory 612. The memory stores a server operating system 614, a control module 616 and one or more multi-bitrate (MBR) files 618. In the present example, the MBR files 618 contain multimedia data that may be streamed to the client 604. The control module 616 oversees execution of the server functionality described below to determine bandwidth availability during the streaming process.

The client 604 includes a processor 620, a network interface 622, a user input module 624 (e.g. a keyboard, mouse, etc.) and a display 626. The client 604 also includes memory 630, which stores a client operating system 632, a bandwidth measurement module 634, a history module 636 and one or more applications 638 that utilize streaming content from one or more remote source.

The control module 634 controls the execution of client functionality for measuring available bandwidth during content streaming and will be discussed in greater detail below. The bandwidth measurement module 636 provides the functionality to calculate the bandwidth based on the packet size, time sent, time received, etc.

The history module 638 stores a history list (similar to the history list 300 shown in FIG. 4) for transmission rates experienced with each of several sources from which the client 604 has previously received streaming content, the history lists being designated herein as source_1 642, source_2 644 through source_n 646.

The memory 630 also stores a content buffer 648 that is used to store content received from the server 602 until the client 604 is ready to play the content. Content buffers are well known in the art and are used to prevent artifacts in the content presentation.

The elements and/or modules shown and described with respect to FIG. 5 may be implemented as hardware, software or a combination of both. The functionality of the elements and/or modules as pertaining to the appended claims will be described in greater detail, below, with respect to subsequent figures.

Methodological Implementation—Server

Figure 6:
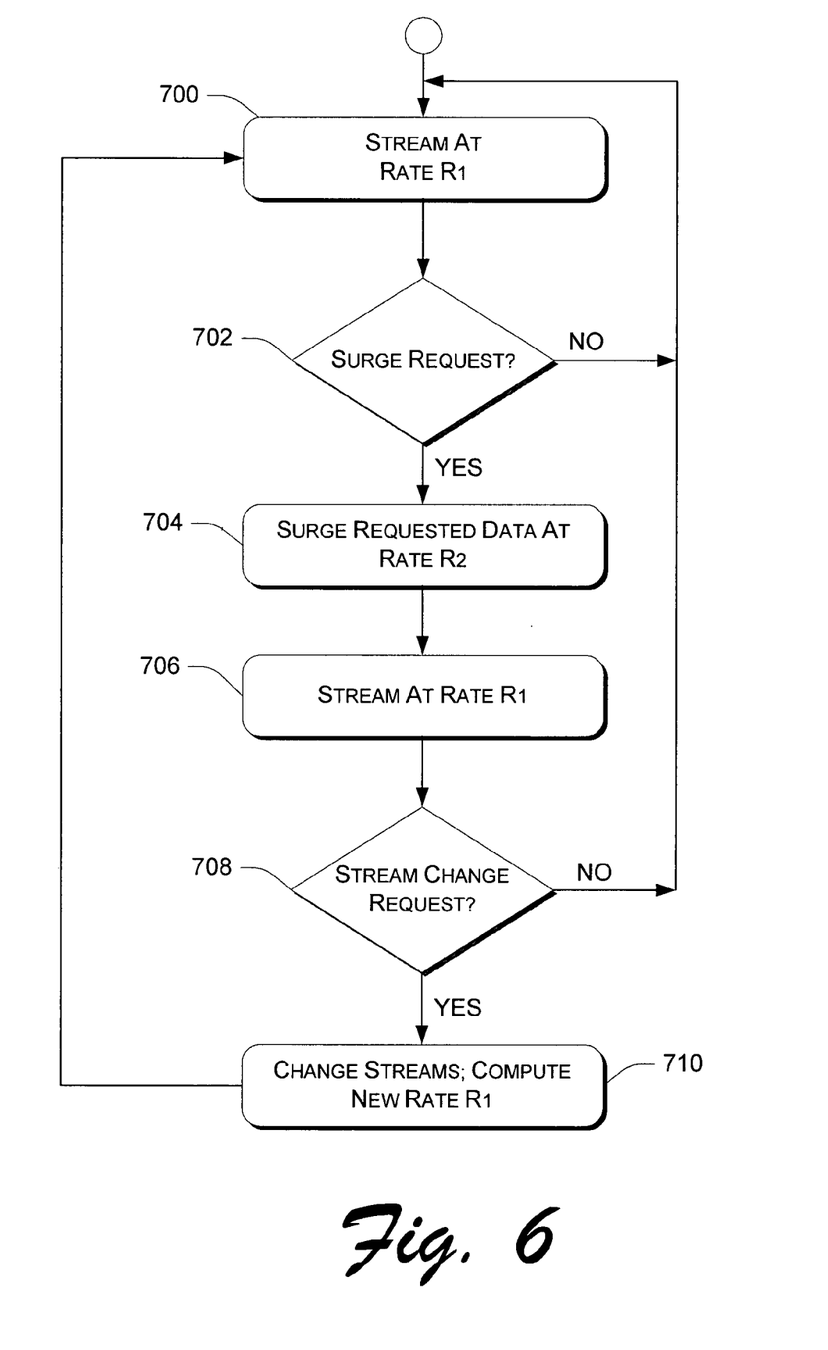
FIG. 6 is a flowchart illustrating the methodology of an implementation of the server side of the exemplary midstream bandwidth measurement technique.

FIG. 6 is a flowchart illustrating the methodology of an implementation of the server side of the exemplary midstream bandwidth measurement techniques described herein. In the discussion of FIG. 6, continuing reference will be made to the elements and reference numerals of FIG. 5. Unless otherwise noted, the functionality attributed to the server 602 below is carried out by the control module 616 of the server 602.

At block 700, the client 604 connects to the server 602 at an initial transmission rate (Rate R1) to receive content streaming from an MBR file 618. Rate R1 may be determined by any method known in the art, whether or not described above in the Background section. The initial transmission rate may be user-selected or may be automatically determined upon connection of the client 604 to the server 602.

At some point during the transmission of the streaming content, the server 602 receives a request from the client 604 to surge the transmission rate to a rate higher than Rate R1 (block 702). The duration of the surge may be specified by the client in one of several ways.

For example, the request may include a command to send a particular number of seconds of data (content) at a higher rate, to send a certain number of data packets at a higher rate, or to send a specified number of bytes of data at a higher rate. Any method known in the art by which the client 604 may request a particular amount of surged data from the server 602 may be implemented without departing from the scope of the described systems and methods.

As long as no surge request is detected by the server 602 ("No" branch, block 702) then the streaming continues to the client 604 at Rate R1 (block 700). When a surge request is received by the server 602 ("Yes" branch, block 702), then the server 604 transmits the appropriate amount of data to the client 604 at a higher transmission rate—Rate R2—at block 704. The higher transmission rate, Rate R2, may be specified by the client or may be previously set by agreement between the client and server entities, such as an agreement that a surge request denotes a request to surge data at a rate that is 10% higher than the current transmission rate or to increase the rate to a next higher rate in a series of predetermined rates.

Rate R2 need not be the next higher streaming bandwidth in the streamed MBR file 618; the transmission rate may be increased gradually to determine the viability of switching to the next higher streaming bandwidth. For example, if the client 604 desires to switch from 100 Kbps to 300 Kbps, the client 604 may initially request a surge rate of 200 Kbps. By gradually increasing the transmission bitrate, the client can observe when congestion begins to occur without necessarily flooding the link entirely and causing a bad end user experience.

During a surge, the server 602 does not necessarily switch from transmitting a first stream in an MBR file 618 to a second stream in the MBR file 618. This is because typical streaming clients can only start rendering on discrete points such as frame boundaries or key frames. When a client shifts to another stream in a conventional MBR file, it must shift on a key-frame boundary for the end user experience to be seamless. Key-frame boundaries are usually not aligned between different streams in an MBR file. Since key-frames occur as little as once every 8–20 seconds depending on the encoded bitrate of the file, a client that incorrectly shifts to a higher bandwidth stream may have a noticeable adverse impact to the viewing experience, since it must wait for another key frame to occur on the destination stream before it can begin re-buffering again when switching back down.

To mitigate this problem, it is valuable to first verify that the network connection can sustain the increased bandwidth before actually switching to a different stream. The client 604 can do this by requesting the existing stream to be sent at a rate equivalent to the higher bitrate stream. If the bandwidth is insufficient, the client can remain on the same (lower) bitrate stream and therefore avoid waiting for the arrival of the next key frame had it erroneously switched up and then back down again.

After the surged data has been sent by the server 602 to the client 604, the server 602 resumes transmission at Rate R1 (block 706). Thereafter, at block 708, the server 602 may receive a request from the client 604 to begin streaming data from a different stream in the multiple bit rate file ("Yes" branch, block 708), i.e. to increase (or decrease) the current transmission rate (Rate R1). The server 602 then changes streams at block 710 and computes a new transmission rate, Rate R1, that corresponds to the newly selected stream. The new Rate R1 is not necessarily the same as the surged transmission rate, Rate R2.

As long as a stream change request is not received ("No" branch, block 708), then the server 602 continues to stream at Rate R1 (block 700) while monitoring for another surge request (block 702) or stream change request (block 708).

It is noted that there is not necessarily a one-to-one correspondence between surge requests and stream change requests. Also, the order of a surge request and a stream change request is not necessarily as shown in the flow diagram of FIG. 6, though the order shown is that which will typically be encountered in practice. For example, it is possible for a client to send multiple surge requests before it sends a stream change request. It is also possible for a client to send a stream change request to a lower-rate stream (i.e. a request to decrease the transmission rate) immediately after sending a stream change request to a higher-rate stream without sending an intermediate surge request.

It is noted that the previous example deals with surging the transmission rate to take advantage of abatement in network congestion. Those skilled in the art will readily understand that the system may also be used to request a decrease in the transmission rate in response to network congestion.

Methodological Implementation—Client

Figure 7:
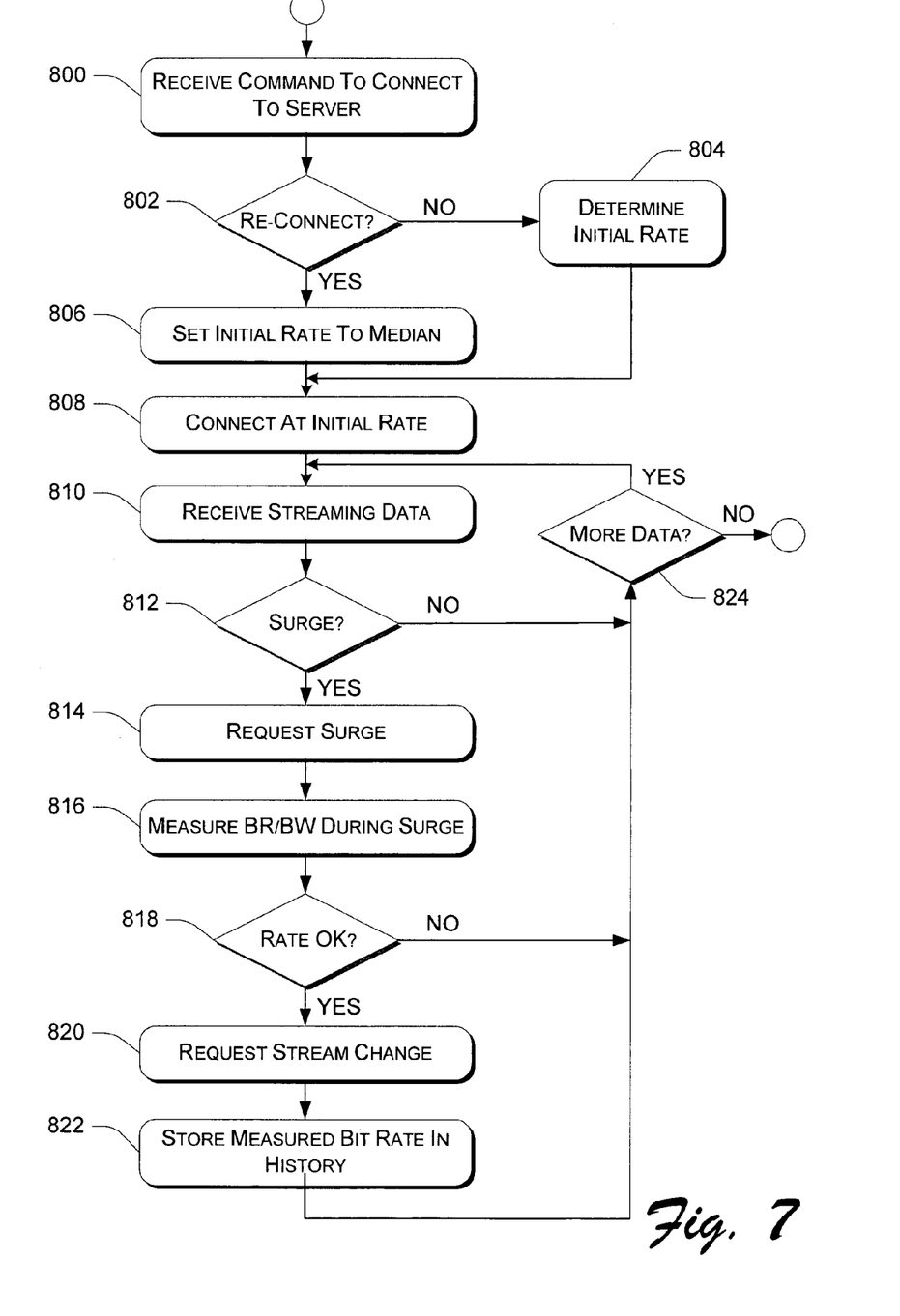
FIG. 7 is a flowchart illustrating the methodology of an implementation of the client side of the exemplary midstream bandwidth measurement technique.

FIG. 7 is a flowchart illustrating the methodology of an implementation of the client side of the exemplary midstream bandwidth measurement technique. In the discussion of FIG. 7, continuing reference will be made to the elements and reference numerals of FIG. 5.

At block 800, the user input module 624 of the client 604 receives a command to connect to the server 602 to receive streaming content. This input may simply be a mouse click on a representation of an MBR file 618 on the server 602. The control module 634 determines if the client 604 has previously connected to the server 602 at block 802. If not ("No" branch, block 802), then the control module 634 determines the initial rate at which to connect to the server at block 804. This may be done in any way described herein or known in the art.

If the client 604 has previously connected to the server 602 ("Yes" branch, block 802), then the control module 634 refers to the history module 638 to determine an appropriate rate at which to initially connect to the server 602. More particularly, a history file associated with the server (source_1 642 . . . source_n 646) is examined and the initial rate is set at the median rate of the transmission rates included in the history file associated with the server 602 (at block 806). Taking the median of the stored measurements is not necessary, as other means of determining the initial rate may be implemented, such as by taking the mean of the rates. However, for this example, the median rate is used as the initial connection rate.

At block 808, the client 604 connects to the server 602 at the initial rate and begins to receive streaming content from the server 602 at block 810. As long as the client 604 does not determine it is time to request a transmission rate surge ("No" branch, block 812), the client continues to receive the streaming data (block 810) at the initial, or current, rate as long as there is more streaming data to receive ("Yes" branch, block 824).

The determination of when a surge is desired may be based on one or more criteria programmed into the client 604. In at least one implementation, the control module 634 is configured to request a rate surge periodically to determine if the streaming rate can be increased.

When the control module 634 determines that it is time to request a surge ("Yes" branch, block 812), the client 604 requests the server 602 to surge the transmission rate at block 814. The amount of streaming data requested to be surged (i.e. transmitted at a higher transmission rate than the initial transmission rate) may be represented in one of several ways. In one implementation, the client 604 may request the server 602 to send "n" seconds of (future) streaming data at an increased rate. The increased rate may be specifically mentioned (e.g. 200 Kbps) or the request may denote a transmission rate increase of, for example, ten percent (10%).

In another implementation, the client 604 requests that "x" number of data packets be transmitted at an increased rate. Again, the increased rate may be specified in a number of ways. In yet another implementation, the client 604 may request the server 602 to send "y" bytes of data and an increased rate. Any method 11 by which the client 604 can communicate to the server 602 a request for a particular amount of future streaming data may be utilized in accordance with the systems and methods described herein.

When the surged data arrives at the client 604, the bandwidth measurement module 636 assesses the viability of the surged transmission rate by any method known in the art and/or described herein (block 816). This typically entails measuring the streaming bit rate and/or the bandwidth available during the surged transmission.

To appropriately identify and measure the surged data, the client 604 must be able to identify and distinguish surged data from pre-surge data and post-surge data.

As part of the bandwidth measurement process, the client 604 inspects data packets after a surge request to determine when a surged streaming rate begins and ends. In one implementation, the server 602 is configured to set a flag in a first data packet indicating that the data packet is the first data packet in a series of data packets included in the surged transmission. Similarly, the server 602 is also configured to flag a last data packet to indicate that the data packet is the last data packet in the surged transmission. The client 604 is configured to inspect data packets and identify the flagged data packets.

In at least one implementation, the client 604 is configured to request a surge beginning at a specific time for a specific duration. In such an implementation, the client 604 is also configured to identify a time stamp associated with a data packet to determine that the surge has begun, and to identify a time stamp associated with a subsequent data packet to determine that the surge has concluded.

If the client 604 has requested a surge of "x" number of data packets, then the client 604 may be configured to identify a flag indicating a data packet is an initial data packet of the surge and to identify the conclusion of the surge by determining when "x" number of data packets have been received by the client.

If the client 604 has requested a surge of "y" bytes of data, then the client 604 may be configured to identify a flag indicating a data packet is an initial data packet of the surge and to identify the conclusion of the surge by determining when "y" number of bytes have been received.

In another implementation, the server 602 may flag each data packet that is surged, i.e. identify the surged data packets as being back to back data packets to be used for bandwidth measurement purposes. In this case, the client 604 is configured to identify each flagged data packet as a surged data packet.

In yet another implementation, a separate packet (sometimes known as a "sender report") is sent that specifies sequence numbers of a first surged packet and a last surged packet. (Each data packet includes a "sequence number" field, which is a number that increments by one for each packet). The surged data packets can be identified from this information.

At block 818, the control module 634 determines if the surged rate is viable for continuing for the remaining streaming data. To do this, the control module 634 first determines if the measured streaming rate (block 816) is greater than or equal to the current bit rate. If so, the control module 634 then determines if the bit rate of the next higher stream that would be selected if the control module 634 requested a stream change is less than or equal to the measured rate (block 816). In other words, if a stream change request would result in a new bit rate to exceed that measured in block 816, then the request should not be made. In other words, in this instance, the surged rate is not viable for continuing for the remaining streaming data ("No" branch, block 818).

If the surged rate is not viable for continuing for the remaining streaming data ("No" branch, block 818), then subsequent streaming data is received at the same rate (at block 810) if there is more streaming data available ("Yes" branch, block 824). The process terminates if no further streaming data is available ("No" branch, block 824).

If the surged rate is viable for subsequent streaming ("Yes" branch, block 818), then the client 604 requests the server 602 to change streams to a next higher bit rate stream in the MBR file (block 820). The streaming bit rate that was measured during the surge (block 816) is then recorded in the history module 638 and associated with the server 602 (block 822).

In at least one implementation, to reduce the negative impact of a bad measurement taken at block 816, the measured bit rate is combined with the bit rates stored in the history module 638 to derive a new median bit rate. This new median bit rate is the bit rate that is used to determine if the surged rate (i.e. the new median bit rate) is viable for subsequent streaming. However, the bit rate value that is stored in the history module 638 at block 822 is the actual measured bit rate (i.e. before filtering with the bit rates in the history module).

Increasing/Diminishing the Content Buffer

Network congestion can often leave a client buffer smaller than what is required to comfortably shield the user from future network jitter and congestion. To counteract this problem, the client 604 may increase—or grow—the content buffer 648 during a streaming rate surge.

During any streaming rate surge the data is received at an increased rate but may not be played at a similar rate. In other words, the content may be executed at a current rate while the surge is in process. The surged data may be used in such instances to grow the content buffer 648 of the client 604 and provide additional protection against artifacts that can detract from the user experience.

Likewise, the client 604 may also diminish the size of the content buffer 648 in the event that there is more data in the content buffer 648 than is required by the client 604.

Exemplary Computing Environment

Figure 8:
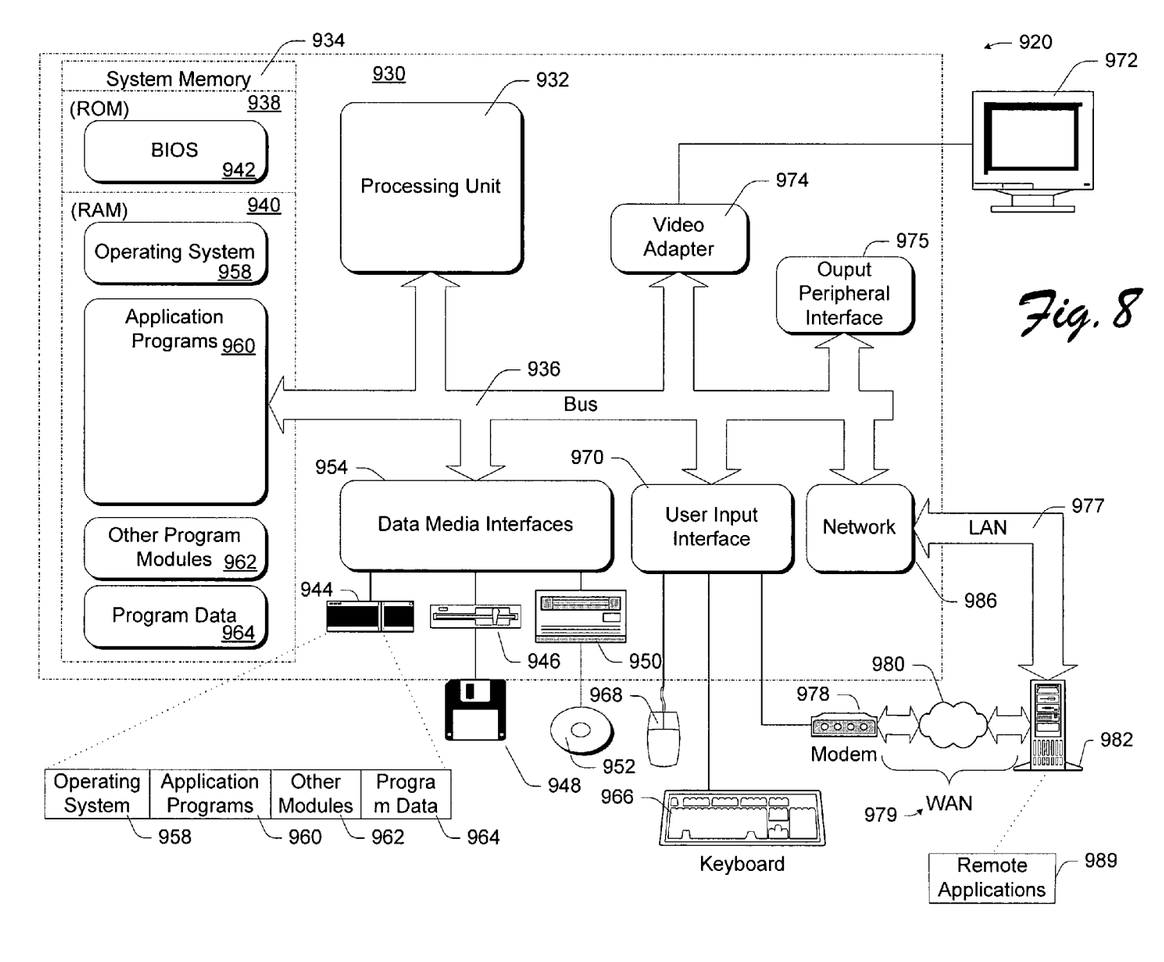
FIG. 8 is an example of a computing operating environment capable of implementing the server side and/or the of the exemplary bandwidth meter.

FIG. 8 illustrates an example of a suitable computing environment 920 on which the exemplary systems and methods for midstream bandwidth determination may be implemented.

Exemplary computing environment 920 is only one example of a suitable computing environment and is not intended to suggest any limitation as to the scope of use or functionality of the exemplary bw-meter. Neither should the computing environment 920 be interpreted as having any dependency or requirement relating to any one or combination of components illustrated in the exemplary computing environment 920.

The exemplary midstream bandwidth measurement techniques are operational with numerous other general purpose or special purpose computing system environments or configurations. Examples of well known computing systems, environments, and/or configurations that may be suitable for use with the exemplary systems and methods include, but are not limited to, personal computers, server computers, thin clients, thick clients, hand-held or laptop devices, multiprocessor systems, microprocessor-based systems, set top boxes, programmable consumer electronics, wireless phones, wireless communication devices, network PCs, minicomputers, mainframe computers, distributed computing environments that include any of the above systems or devices, and the like.

The exemplary midstream bandwidth measurement systems and methods may be described in the general context of computer-executable instructions, such as program modules, being executed by a computer. Generally, program modules include routines, programs, objects, components, data structures, etc. that perform particular tasks or implement particular abstract data types. The exemplary midstream bandwidth measurement techniques may also be practiced in distributed computing environments where tasks are performed by remote processing devices that are linked through a communications network. In a distributed computing environment, program modules may be located in both local and remote computer storage media including memory storage devices.

As shown in FIG. 7, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932. Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 930 typically includes a variety of computer readable media. Such media may be any available media that is accessible by computer 930, and it includes both volatile and non-volatile media, removable and non-removable media.

In FIG. 7, the system memory includes computer readable media in the form of volatile, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 7 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 7 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 7, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 7 illustrates remote application programs 989 as residing on a memory device of remote computer 982. It will be appreciated that the network connections shown and described are exemplary and other means of establishing a communications link between the computers may be used.

Exemplary Operating Environment

FIG. 8 illustrates an example of a suitable operating environment 920 in which the midstream bandwidth determination techniques may be implemented. Specifically, the midstream bandwidth determination is implemented by any program 960-962 or operating system 958 in FIG. 8.

The operating environment is only an example of a suitable operating environment and is not intended to suggest any limitation as to the scope of use of functionality of the midstream bandwidth measurement techniques described herein. Other well known computing systems, environments, and/or configurations that may be suitable for use with the described systems and methods include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

Computer-Executable Instructions

An implementation of the exemplary midstream bandwidth measurement systems and methods may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary midstream bandwidth measurement techniques may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the subject matter has been described in language specific to structural features and/or methods, it is to be understood that the invention defined by the appended claims is not necessarily limited to the specific features or methods described herein. Rather, the specific features and methods are disclosed as exemplary forms of implementing the claimed systems and methods.

The invention claimed is:

1. One or more computer-readable media containing computer-executable instructions that, when executed on a computer, perform the following steps:
   - requesting a sewer to transmit content file data over a network at a first transmission rate;
   - while receiving a portion of the content file data at the first transmission rate, requesting the server to transmit a specific portion of the content file data over the network at a second transmission rate;
   - receiving the specific portion of the content file data from the server at an actual transmission rate which is less than or equal to the second transmission rate;
   - determining if the network can viably support transmission of the content file data at the actual transmission rate during receipt of the specific portion of the content file data;
   - if the network can viably support transmission of the content data at the actual transmission rate, requesting the sewer to transmit subsequent content file data at a rate that is not greater than the actual transmission rate;
   - if the network cannot viably support transmission of the content data at the actual transmission rate, automatically receiving subsequent content file data at the first transmission rate; and
   - wherein the subsequent content file data is content file data that is transmitted after the specific portion of content file data has concluded transmission.

2. The one or more computer-readable media as recited in claim 1, further comprising storing the actual rate in a history file associated with the server that contains one or more previous transmission rates at which content file data was adequately received from the server.

3. The one or more computer-readable media as recited in claim 1, further comprising determining the first transmission rate from a history list associated with the server that contains one or more previous transmission rates at which content file data was adequately received from the server.

4. The one or more computer-readable media as recited in claim 3, wherein the determining the first transmission rate from a history list further comprises determining a median rate included in the history list as the first transmission rate.

5. The one or more computer-readable media as recited in claim 1, further comprising calculating available network bandwidth to determine the first transmission rate.

6. The one or more computer-readable media as recited in claim 1, further comprising detecting when the transmission of the content file data at the actual transmission rate begins.

7. The one or more computer-readable media as recited in claim 1, wherein the specific portion of the content file data is specified as a number of seconds of transmission of content file data.

8. The one or more computer-readable media as recited in claim 1, wherein the specific portion of the content file data is specified as a number of bytes of content file data.

9. The one or more computer-readable media as recited in claim 1, wherein the specific portion of the content file data is specified as a number of data packets of content file data.

10. The one or more computer-readable media as recited in claim 1, wherein the actual transmission rate is a higher rate than the first transmission rate.

11. The one or more computer-readable media as recited in claim 1, wherein the actual transmission rate is a lower rate than the first transmission rate.

12. A computer-implemented method comprising:
   - requesting a server to transmit content file data over a network at a first transmission rate;
   - while receiving a portion of the content file data at the first transmission rate, requesting the server to transmit a specific portion of the content file data over the network at a second transmission rate;
   - receiving the specific portion of the content file data from the server at an actual transmission rate which is less than or equal to the second transmission rate;
   - determining if the network can viably support transmission of the content file data at the actual transmission rate during receipt of the specific portion of the content file data;
   - if the network can viably support transmission of the content data at the actual transmission rate, requesting the server to transmit subsequent content file data at a rate that is not greater than the actual transmission rate;
   - if the network cannot viably support transmission of the content data at the actual transmission rate, automatically receiving subsequent content file data at the first transmission rate; and
   - wherein the subsequent content file data is content file data that is transmitted after the specific portion of content file data has concluded transmission.

13. The method as recited in claim 12, further comprising storing the actual rate in a history file associated with the server that contains one or more previous transmission rates at which content file data was adequately received from the server.

14. The method as recited in claim 12, further comprising determining the first transmission rate from a history list associated with the server that contains one or more previous transmission rates at which content file data was adequately received from the server.

15. The method as recited in claim 14, wherein the determining the first transmission rate from a history list further comprises determining a median rate included in the history list as the first transmission rate.

16. The method as recited in claim 12, further comprising calculating available network bandwidth to determine the first transmission rate.

17. The method as recited in claim 12, further comprising detecting when the transmission of the content file data at the actual transmission rate begins.

18. The method as recited in claim 12, wherein the specific portion of the content file data is specified as a number of seconds of transmission of content file data.

19. The method as recited in claim 12, wherein the specific portion of the content file data is specified as a number of bytes of content file data.

20. The method as recited in claim 12, wherein the specific portion of the content file data is specified as a number of data packets of content file data.

21. The method as recited in claim 12, wherein the actual transmission rate is a higher rate than the first transmission rate.

22. The method as recited in claim 12, wherein the actual transmission rate is a lower rate than the first transmission rate.

23. A system comprising:
a processor;
one or more computer-readable media;
computer-executable instructions on the one or more computer-readable media which, when executed by the processor, implements a method comprising:
requesting a server to transmit content file data over a network at a first transmission rate;
while receiving a portion of the content file data at the first transmission rate, requesting the server to transmit a specific portion of the content file data over the network at a second transmission rate;
receiving the specific portion of the content file data from the server at an actual transmission rate which is less than or equal to the second transmission rate;
determining if the network can viably support transmission of the content file data at the actual transmission rate during receipt of the specific portion of the content file data;
if the network can viably support transmission of the content data at the actual transmission rate, requesting the server to transmit subsequent content file data at a rate that is not greater than the actual transmission rate;
if the network cannot viably support transmission of the content data at the actual transmission rate, automatically receiving subsequent content file data at the first transmission rate; and
wherein the subsequent content file data is content file data that is transmitted after the specific portion of content file data has concluded transmission.

24. The system as recited in claim 23, further comprising storing the actual rate in a history file associated with the server that contains one or more previous transmission rates at which content file data was adequately received from the server.

25. The system as recited in claim 23, further comprising determining the first transmission rate from a history list associated with the server that contains one or more previous transmission rates at which content file data was adequately received from the server.

26. The system as recited in claim 25, wherein the determining the first transmission rate from a history list further comprises determining a median rate included in the history list as the first transmission rate.

27. The system as recited in claim 23, further comprising calculating available network bandwidth to determine the first transmission rate.

28. The system as recited in claim 23, further comprising detecting when the transmission of the content file data at the actual transmission rate begins.

29. The system as recited in claim 23, wherein the specific portion of the content file data is specified as a number of seconds of transmission of content file data.

30. The system as recited in claim 23, wherein the specific portion of the content file data is specified as a number of bytes of content file data.

31. The system as recited in claim 23, wherein the specific portion of the content file data is specified as a number of data packets of content file data.

32. The system as recited in claim 23, wherein the actual transmission rate is a higher rate than the first transmission rate.

33. The system as recited in claim 23, wherein the actual transmission rate is a lower rate than the first transmission rate.

* * * * *

UNITED STATES PATENT AND TRADEMARK OFFICE
CERTIFICATE OF CORRECTION

PATENT NO. : 7,054,774 B2
APPLICATION NO. : 10/609329
DATED : May 30, 2006
INVENTOR(S) : Batterberry et al.

It is certified that error appears in the above-identified patent and that said Letters Patent is hereby corrected as shown below:

On the Title page, Item (56), under "Other Publications", in column 2, line 2, delete "Mutlitmedia" and insert -- Multimedia --, therefor.

On Title page 2, Item (56), under "Other Publications", in column 2, line 16, delete "Joing" and insert -- Joint --, therefor.

On Title page 2, Item (56), under "Other Publications", in column 2, line 18, delete "pager" and insert -- pages --, therefor.

On Title page 2, Item (56), under "Other Publications", in column 2, line 40, delete "ivdeo" and insert -- video --, therefor.

On Title page 2, Item (56), under "Other Publications", in column 2, line 41, delete "Networkign" and insert -- Networking --, therefor.

In column 7, line 54, after "extended" delete "n" and insert -- in --, therefor.

In column 12, line 9, after "method" delete "11".

In column 14, lines 25–41, delete "As shown in FIG. 7, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932. Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus." and insert
-- As shown in FIG. 7, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

CERTIFICATE OF CORRECTION (continued)
U.S. Pat. No. 7,054,774 B2

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus. --, therefor.

In column 17, line 14, in Claim 1, delete "sewer" and insert -- server --, therefor.

In column 17, line 29, in Claim 1, delete "sewer" and insert -- server --, therefor.

Signed and Sealed this

Thirteenth Day of April, 2010

David J. Kappos
*Director of the United States Patent and Trademark Office*